G. C. GORDON.
COUNTERBALANCED CRANK SHAFT.
APPLICATION FILED JAN. 5, 1917.
1,255,409.
Patented Feb. 5, 1918.
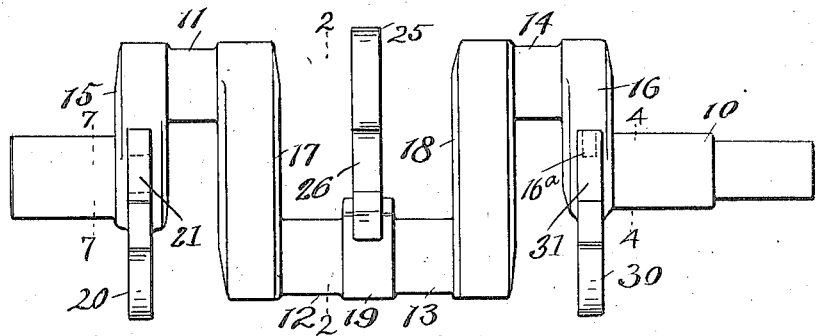
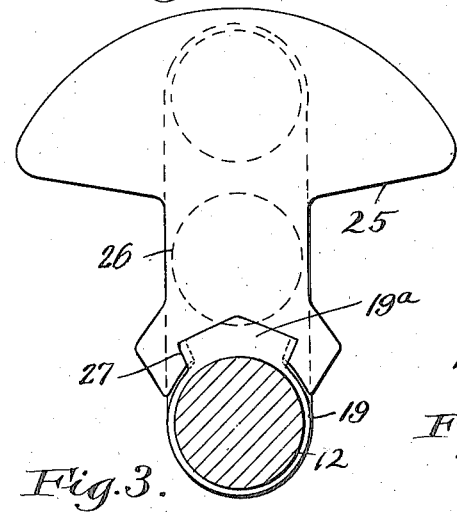
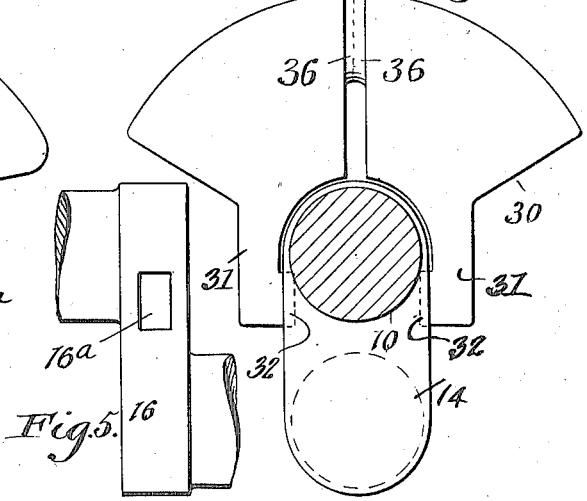
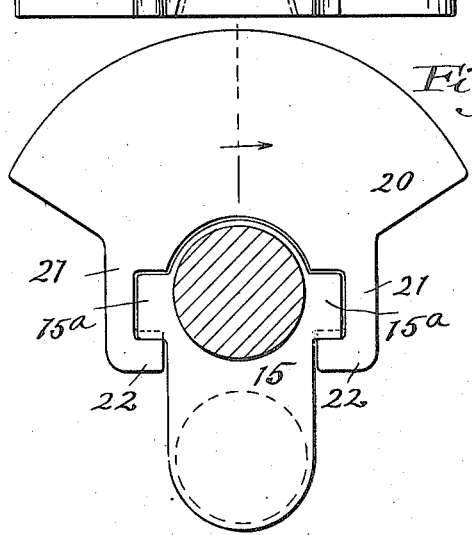

UNITED STATES PATENT OFFICE.

GEORGE C. GORDON, OF CLEVELAND, OHIO, ASSIGNOR TO THE PARK DROP FORGE COMPANY, OF CLEVELAND, OHIO, A CORPORATION OF OHIO.

COUNTERBALANCED CRANK-SHAFT.

1,255,409.   Specification of Letters Patent.   Patented Feb. 5, 1918.

Application filed January 5, 1917. Serial No. 140,686.

*To all whom it may concern:*

Be it known that I, GEORGE C. GORDON, a citizen of the United States, residing at Cleveland, in the county of Cuyahoga and State of Ohio, have invented a certain new and useful Improvement in Counterbalanced Crank-Shafts, of which the following is a full, clear, and exact description.

The cost of counterbalanced crank shafts with integral counterweights is prohibitive of any large use thereof. Therefore it has come to be common practice to construct the counterweights separately and to fasten them on in various ways. When so-constructed counterbalanced crank shafts are put to use, especially in high speed internal combustion engines, the stresses imposed on the fastening devices by the generated centrifugal force are enormous; wherefore strong and expensive fastening means are required to make the structure safe. Even when such are employed many engineers are apprehensive that conditions may arise in which the fastening means will be inadequate.

The object of this invention is to produce a counterbalanced crank shaft for a reasonable price, which is so constructed as to render it practically impossible for any counterweight to be thrown off through any weakening of the fastening means by which they are attached to the shaft. This object is attained by forming the crank shaft and the counterweights with shoulders so placed that when the counterweights are properly disposed with respect to the off-center weights they are intended to counterbalance, and are secured in the required positions, the shoulders will be in engagement and will resist that movement of the counterweights which centrifugal force tends to produce.

The invention in several specific forms is shown in the accompanying drawings and is hereinafter described and pointed out definitely in the appended claims.

In the drawings, Figure 1 is a side elevation of a counterbalanced crank shaft embodying the invention in three specific forms; Fig. 2 is a sectional view in the plane of line 2—2 on Fig. 1; Fig. 3 is a plan view of the counterweight 25; Fig. 4 is a sectional view in the plane of line 4—4 on Fig. 1; Fig. 5 is a side elevation of a part of the crank shaft and particularly of the crank arm 16; Fig. 6 is a plan view of the two parts of the counterweight 30; Fig. 7 is a sectional view in the plane of line 7—7 on Fig. 1, and Fig. 8 is a radial section of the counterweight 20.

A four throw crank shaft 10 has been selected for the exemplification of this invention. The four crank pins thereof are indicated by 11, 12, 13, 14. The short crank arms 15, 16, respectively, connect the crank pins 11 and 14 to the crank shaft, while the two long arms 17, 18, respectively, connect the crank pin 11 with one end of the member 19 of which the two crank pins 12, 13, are parts, while the long arm 18 connects the other end of this member with the crank pin 14.

A counterweight 20 is connected with the inner end of the crank arm 15, and extends therefrom on the opposite side of the axis of the crank shaft so as to counterbalance, to whatever extent is desired, the offcenter weight of the crank arm 15 and a part of the crank pin. The counterweight 30 is connected with the inner end of the crank arm 16, and occupies a similar position with respect thereto. The counterweight 25 is connected with the member 19 between the two crank pins 12, 13, and extends therefrom directly across the axis of the crank shaft 10.

To the extent described the crank shaft is of familiar construction. The novel feature of the present invention is in the manner of combining the several counterweights to the crank shaft. The basic idea is the formation on the counterweights and on the parts of the crank shafts to which they are attached, of shoulders which are held in engagement with each other,—said shoulders being so placed that their engagement will resist the centrifugal force tending to pull the counterweights loose from the crank shaft.

The specific construction of the three counterweights and the interengaging shoulders on them and the crank shaft, are slightly different, but in all three examples the same basic idea is present. With respect to the counterweight 20 it has two arms 21 which straddle the crank arm 15; and on each of these arms 21 is an inturned lug 22. Each of these lugs passes behind two outwardly projecting lugs 15ª formed on the sides of the arm 15. The counterweight is then fixed to the crank shaft with the opposed shouldered surfaces of the lugs 15ª and 22 in engagement. In the best construction the engaging surfaces of these lugs 22 and 15ª are electrically welded together; and in order to enlarge as much as practical the welded together engaging surfaces said surfaces of the lugs 15ª are formed in the V-shaped recess while the surfaces of the lugs 22 are formed V-shaped to fit. It is obvious that any tendency of the counterweights to be thrown off or torn loose by centrifugal force while the shaft is rotating is not borne by the welded joint, but by the interengagement of the lugs as described.

The counterweight 30 is very similar to the counterweight 20 in that it has two arms 31, and each arm has an inwardly turned lug. 32. The crank arm 16, however, has two recesses 16ª in its side for the reception of these two lugs. The lugs are projected into said recesses and are brought into engagement with their ends and the counterweight is then fixed in this position. This latter result is preferably attained by welding the ends of the lugs to the bottoms of these recesses. To facilitate the assembling of the parts the counterweight 30 is made in two halves, and these halves are formed on their opposed edges with lugs 36 which are preferably welded together.

The counterweight 25 is formed with a shank 26 and in the end of this shank is a dovetailed recess 27. There is a dovetailed lug 19ª formed on the part 19 and projecting therefrom toward the axis of the shaft. When this counterweight is assembled in proper relation to the crank shaft this dovetailed lug 19ª projects into the dovetailed recess 27 and the inclined walls of this recess and lug are brought into contact and welded together.

Having described my invention, I claim:—

1. In a counterbalanced crank shaft, the combination of a crank shaft and counterweights fixedly secured thereto, each in substantial opposition to the offcenter parts of the crank shaft which it is to counterbalance,—said counterweights and crank shaft being formed with shoulders which engage and oppose that movement of the counterweights relative to the crank shaft which centrifugal force tends to produce.

2. In a counterbalanced crank shaft, the combination of a crank shaft and a counterweight fixedly secured to one of the crank arms of said crank shaft,—said counterweight having two arms which straddle the inner end of the crank arm and are formed with inwardly projecting lugs, and said crank arm having outwardly projecting lugs which respectively engage the lugs on the two arms of the counterweight and oppose that movement of the counterweight relative to the crank shaft which centrifugal force tends to produce.

3. In a counterbalanced crank shaft, the combination of a crank shaft, and a counterweight welded thereto, said counterweight and crank shaft having interengaging shoulders which oppose and prevent that movement of the counterweight relative to the crank shaft which centrifugal force tends to produce.

4. In a counterbalanced crank shaft, the combination of a crank shaft and a counterweight fixedly secured to one of the crank arms of said crank shaft, said counterweight having two arms which straddle the inner end of the crank arm and are formed with inwardly projecting lugs, and said crank arm having shoulders behind which said lugs are disposed and with which they engage,—said lugs being welded to said crank arm.

In testimony whereof, I hereunto affix my signature in the presence of two witnesses.

GEORGE C. GORDON.

Witnesses:
E. L. Thurston,
L. I. Porter.